United States Patent [19]

Saldarini et al.

[11] 4,285,983

[45] Aug. 25, 1981

[54] FIXING VOLATILE FLAVORING AGENT IN STARCH HYDROLYSATE

[75] Inventors: Albert V. Saldarini, Nutley; Robert Doerig, Fort Lee, both of N.J.

[73] Assignee: Norda, Incorporated, East Hanover, N.J.

[21] Appl. No.: 35,349

[22] Filed: May 2, 1979

[51] Int. Cl.³ .................... A23L 1/226; A23L 1/222
[52] U.S. Cl. ..................... 426/534; 426/96; 426/650; 426/651; 252/316; 427/2; 427/3; 427/212
[58] Field of Search ............... 426/96, 534, 650, 651

[56] References Cited

U.S. PATENT DOCUMENTS

| | | | |
|---|---|---|---|
| 1,155,977 | 10/1915 | Vernon | 426/453 X |
| 2,088,622 | 8/1937 | Stokes et al. | 426/538 |
| 3,849,194 | 11/1974 | Armbruster et al. | 435/99 |
| 3,903,295 | 9/1975 | Palmer | 426/96 X |
| 4,144,357 | 3/1979 | Mohammed | 426/96 |

Primary Examiner—Joseph M. Golian
Attorney, Agent, or Firm—Burns, Doane, Swecker & Mathis

[57] ABSTRACT

The present invention is directed to a process for fixing or entrapping a fixable agent, such as acetaldehyde, in a carrier matrix, such as starch hydrolysates having a dextrose equivalent of not greater than about 28, to impart a stable, free flowing particulate configuration to the carrier-fixed agent. The process is achieved by impinging aqueous droplets containing the fixable agent onto particles of the carrier material in a manner which causes dissolution of the carrier particles into the droplets to form a saturated solution of the carrier in the droplet. A film then forms on the surface of the saturated droplet solutions by preferential evaporation of the water therefrom. This causes the droplets to set to a permanently particulate form thereby entrapping the fixable agent.

9 Claims, No Drawings

FIXING VOLATILE FLAVORING AGENT IN STARCH HYDROLYSATE

BACKGROUND OF THE INVENTION

1. Field of the Invention

The present invention relates to a process for fixing highly volatile or non-volatile water soluble and/or water emulsifiable materials into a carrier matrix to impart a stable free flowing particulate form thereto.

2. Summary of the Prior Art

There has been a considerable effort in the past directed toward achieving the reduction of a variety of materials to a sensibly dry condition for purposes of convenience and/or stability during merchandising. Such efforts have concentrated heavily in the food, drug, and cosmetic industry where many natural and synthetic materials (referred to herein as fixable agents) which are employed for their aroma, flavoring, or medicinal properties are required to be placed in a particulate powder configuration. The problems encountered in achieving these goals are caused primarily by one or more of a number of properties possessed by these fixable agents such as high volatility, chemical instability, and toxic nature when inhaled. For example, many aroma and flavoring agents typically employed in food products are known to rapidly deteriorate upon exposure to the atmosphere, particularly at elevated temperatures. Moreover, those agents which are highly volatile are difficult to capture in solid form without a substantial loss at great economic cost when processed at elevated temperatures.

The methods which have been employed in the past to impart a powdered configuration to fixable agents include a variety of techniques such as plating, spray-drying, crystal occlusion, freeze drying, as well as a variety of other miscellaneous techniques.

Many of the above described techniques are similar in that they employ a carrier or diluent which serves as a solid powder matrix material onto or into which the fixable agent is applied or incorporated. Commonly employed carriers include a wide variety of gums, starches, sugars, starch hydrolysates and the like which are specific to each technique. The process conditions employed for each technique, however, play a significant role in determining the properties of the resulting fixed powder and are often associated with their own particular processing disadvantages.

For example, in a typical spray-drying operation a fixable material such as a flavoring agent, and a suitable carrier are dissolved or dispersed in water and then sprayed into an evaporative atmosphere using large quantities of air at elevated temperature.

A significant drawback in the spray-drying of flavors and odorants has been the required use of heat and expensive equipment in its production. The fugacity of certain nuances necessary in the "fresh" quality of fruit flavors or perfumes is particularly a problem in the standard spray-drying techniques. The heat necessary to effect the drying encapsulation is the primary cause of the loss of these highly important flavor and odor volatiles. In flavors and odorants, the lost volatiles are usually compensated for by increased addition of these components to the basic oil used in the emulsion destined for spray-drying. In some cases the balance may be restored, but the heat involved accelerates many other undesirable reactions within the flavor or odorant compound. These reactions involve oxidation, acetal formation, etc. Moreover, the large volumes of air which are employed in spray-drying require costly and time consuming purification procedures to avoid pollution problems if the fixable material which is evaporated during spray-drying is an irritant when inhaled, such as mustard oil.

Representative patents which illustrate various carriers and fixable agents include U.S. Pat. Nos. 3,314,803; 3,736,149; 3,786,159; 3,821,436; and 4,059,706.

In the crystal occlusion technique the carrier and fixable material are added to water to form a saturated solution of the carrier. The carrier is then allowed to crystalize from the solution and the fixable material is trapped as an impurity within the crystals. The crystal occlusion technique typically can only achieve low fixation levels of less than about 1% and often requires costly procedures for handling the saturated solution to prevent premature crystallization.

Representative patents which illustrate the crystal inclusion technique include U.S. Pat. Nos. 3,767,430; 3,787,592; 3,843,822; and 3,889,008.

The freeze drying technique as illustrated by U.S. Pat. No. 3,660,115 can incorporate the fixable material into a carrier at room temperature but requires expensive and sophisticated equipment to do so. Moreover, the carrier matrix material having the fixable material incorporated therein is extremely porous and requires the application of a film forming material to seal the entrances to the interstices of the carrier-powder particles. This is necessary to insure protection of the trapped or sorbed fixable material from undesirable exposure to the atmosphere which can cause degradation and volatilization thereof. The additional coating step has obvious economic disadvantages.

A number of techniques rely on certain types of sorption phenomona. For example, U.S. Pat. No. 3,903,295 employs a method wherein the fixable material is incorporated into a viscid medium. The viscid medium is then dispersed to form tacky particles which are sprayed into a bed of powdered carrier particles. Because of the tacky nature of the particles containing the fixable materials the carrier particles coat the surface of the tacky particles. In order to achieve tacky consistency the amount of liquid in the particles must be kept to a minimum. Moreover, it is not required that the viscid medium be water. Other materials, such as mineral oil, and the like can be employed. Consequently, there is a complete lack of recognition of the essential function performed by water in the context of the present invention. In order to form the tacky particles it is necessary to spray the viscid medium under a high pressure. The equipment and energy cost of spraying a highly viscous material possesses obvious economic disadvantages.

U.S. Pat. No. 3,956,511 also relies on one or more sorption phenomenon. The process disclosed therein employs an expanded dextrin as a carrier having a particularly defined bulk density. An expensive and time consuming process is required to expand the bulk density of the carrier material. The fixable material is an aqueous alcohol solution which can contain a maximum of 20% water. Further additional fixable materials can be dissolved into either the alcohol or water components of the aqueous alcohol solution and the solution is mixed with the expanded dextrin particles. Because of the high capillary surface area and porous nature of the expanded dextrin particles their contact with the aqueous alcohol solution induces adsorption and/or absorption of the solution. The primary disadvantage of these porous residues is the fact that the surface of the resulting fixed powdered particles are not sealed against the atmosphere and must therefore be stored in a hermetically sealed package to avoid loss of the volatile constituents present therein. Moreover, since a minimum amount of water is employed in the aqueous alcohol solution the dissolution phenomenon which is believed to operate in the practice of the present invention does not appear to occur.

U.S. Pat. No. 4,022,924 discloses a process wherein a liquid acid is co-dried with a soluble carbohydrate. In one embodiment when the liquid acid is sprayed onto bulk dextrin particles the acid is absorbed on the surface of these particles. Thus, it appears that only the surface of the particles are plated with the liquid acid in this embodiment. Moreover, since concentrated acids are employed, the amount of water present therein, if any, would appear to be kept to a minimum as evidenced by the low water of hydration present in phosphate salts which are used in conjunction with the liquid acids.

U.S. Pat. No. 1,930,527 employs large gum granules rather than powdered particles as a carrier. A water solution containing a fixable material is applied to the surface of agitated gum granules as a spray or mist. When the water solution strikes the surfaces of the granules a thin film of gum solution is formed on the surface thereof and the fixable material penetrates to the center of each granule without dissolving the same. The thin film of gum solution causes the gum granule to stick together. The adherence of the gum granules is acceptable in the context of this patent since a continuous sheet of bound gum granules is desired. However, in the context of the present invention a free flowing powder is desired and this process is incapable of achieving this goal. Moreover, the amount of water which contacts the gum granules is actually restricted to prevent the gum granules from going into solution.

U.S. Pat. No. 2,088,622 discloses a process which relies on the phenomenon of dehydration. More specifically, a fixable material and volatility reducent are emulsified and a dehydrating agent, such as a hygroscopic carbohydrate (e.g., corn starch), is added to the emulsion. The dehydrating agent absorbs water from the water phase of the emulsion and yields a dry material characterized by having a protective film about the emulsoid. This patent lacks any specific process details relating the drying step with a dehydrating agent, such as the particle size of the dehydrating agent, the method of application of the dehydrating agent to the emulsion, or even the configuration of the resulting fixed material. Consequently, there is nothing to suggest that a minimum amount of water must be present in the emulsion in order for the dissolution phenomenon to operate in the manner described in the present invention. Likewise, there is no suggestion that the emulsion must be added to the carrier in controlled amounts to achieve fixation in the manner described herein. Furthermore, the use of highly hygroscopic materials as the dehydrating agent leads to the formation undesirably large clumps of materials.

Other miscellaneous fixation techniques are disclosed in U.S. Pat. Nos. 2,756,177; 3,922,354; and 3,950,549.

There has been a continuing search for efficient, economic methods for achieving fixation of a fixable material in a free flowing powder configuration which imparts extended chemical and physical stability thereto. The present invention is a result of this search.

It is therefore an object of the present invention to provide an economical and energy efficient process capable of encapsulating a variety of volatile and non-volatile natural and synthetic materials with a carrier material without the aid of heat and with an improved degree of safety.

These and other objects and features of the invention will become apparent from the claims and from the following description.

SUMMARY OF THE INVENTION

The present invention provides a process for fixing a fixable agent selected from at least one member of the group consisting of water soluble and water emulsifiable organic, inorganic, natural and synthetic carrier compatible materials in a carrier matrix material to impart a dry free flowing particulate configuration to said carrier fixed agent comprising:

(a) dissolving the fixable agent in a sufficient amount of water to form a solution or aqueous emulsion which is capable of dissolving the carrier material when converted to a droplet configuration at the temperature at which the process is conducted when the fixable agent is water soluble, and emulsifying the fixable agent in the discontinuous phase of an aqueous emulsion having water as the continuous phase, said water in the emulsion being present in an amount sufficient to dissolve the carrier material when converted to droplet configuration at the temperature at which the process is conducted when the fixable agent is water emulsifiable, and wherein the viscosity of said aqueous solution and emulsion is not greater than about 200 cps at the temperature at which the process is conducted;

(b) impinging droplets of a medium, selected from the group consisting of the aqueous solution and aqueous emulsion of (1) containing the fixable agent, onto the surface of a bed of free flowing carrier particles in a manner sufficient to dissolve a portion of the carrier particles into the aqueous portion of said medium droplets to form a saturated solution of the carrier in the droplet, and in a manner sufficient to substantially avoid the coalescence of the droplets, said carrier particles comprising a material characterized by (1) a dissolution characteristic wherein the balance between dissolution time and viscosity response at the temperature at which the process is conducted is sufficient to prevent undue spreading of the medium droplets such that fragile agglomerates of the carrier material and medium droplets are substantially avoided; (2) a solubility in water at the temperature at which the process is conducted of at least 10 g/100 g of water; (3) the ability to form a film upon evaporation of water from a saturated solution of said material in water at the temperature at which the process is conducted; and (4) the ability to pass water through said films of (3) in preference to said fixable agent;

(c) allowing a portion of the water contained in the saturated droplets to evaporate thereby forming a continuous film of the carrier material on the surface of said droplets;

(d) separating the filmed droplets from the carrier particles after said filmed droplets have set to a particulate form which is maintained when contacted with similar filmed droplets and before the remainder of the water present therein passes through the droplet film surface to the extent that the carrier particles remaining in the carrier bed are wet thereby and agglomerate; and (e) drying the separated filmed droplets to allow the remainder of the water present therein to preferentially pass through the film surface.

It is an advantage of the process of the present invention that highly volatile, and sometimes explosive, chemicals can be processed into a dry state with minimal losses and danger. Flammable mixtures are not subject to charges of static electricity since the fixation process is conducted under somewhat humid conditions during the critical stages. The absence of heat during processing and the resultant decrease in volatility enhances the safety of the procedure and significantly reduces losses. The present invention possesses the additional advantages of ease of performance and economy. The reduced vapor pressure encountered at lower temperatures (ambient room temperature in most cases) contributes heavily to the reduction of losses and chemical interactions. Temperatures are not critical and solvent washes for surface oil elimination are not required. A host of standard emulsions and water-soluble materials can be quickly and efficiently fixed in a dry state.

DESCRIPTION OF THE PREFERRED EMBODIMENTS

The primary components employed in the practice of the process of the present invention are fixable agents and carrier materials.

The term "fixable agent" is herein defined to be any organic, inorganic, natural, or synthetic water soluble (i.e., hydrophilic) and/or water emulsifiable (i.e., hydrophobic) material which is compatible with the carrier material, i.e., non-reactive with, and does not interfere with the requisite properties of the carrier material. For purposes of the present invention a substance is defined herein to be water soluble when greater than 0.001/g., preferably greater than about 0.1 g, and most preferably greater than about 10 g thereof can be dissolved in 100 g of water at the temperature at which the process is conducted. For the purposes of the present invention a substance is defined to be water emulsifiable when it can be dispersed with or without the use of a carrier compatible emulsifying agent, in the discontinuous phase of an aqueous emulsion, having the requisite amount of water as described herein, wherein water is the continuous phase, and said emulsion is stable at the temperature at which the process is conducted.

When the utility of the fixable agent is as an additive for comestibles, the fixable agent should be non-toxic and capable of oral consumption without adverse side effects.

Typical classes of well known agents which can be employed in the present invention include flavoring agents both buffered and non-buffered such as essential oils including orange, lemon lime, tangerine, garlic, onion, mustard and the like; bath oil ingredients; physiologically active medicinals such as alkaloids, vitamins, analgesics, inhalants (for release in water) and the like; botanical extracts for flavor and pharmaceutical uses where applicable; perfumes; detergents; coloring agents; insecticidal compounds such as dimethyldichlorovinyl phosphate (D.D.V.P.), snail and slug poisons; animal repellents; and the like. The process of the present invention is especially adapted for the fixation of agents which are characterized by having a rather high volatility and/or are characterized by undergoing change by contact with air.

Typical flavoring agents are described in a reference list by R. Ford, and G. Cramer, in the "Perfumer and Flavorist" Vol. 2, p. 9–62 (1977), the disclosure of which is herein incorporated by reference.

A particularly preferred flavoring agent is acetaldehyde, a highly volatile and explosive compound which has been indentified in a myriad of food products ranging from baked bread to fresh fruit juices.

Water soluble organic and inorganic materials may be fixed in the same system with hydrophobic materials by employing an emulsion wherein the water soluble fixable agent is dissolved in the continuous phase (i.e., water) and the hydrophobic material is dissolved in or constitutes the discontinuous phase.

When a water soluble fixable agent is employed alone it is prepared for the fixation process by dissolution in water to form an aqueous solution. However, in order for the mechanism of the present invention to operate it is essential that the aqueous solution contain sufficient water to permit it to dissolve the carrier material when converted to a droplet configuration at the temperature at which the process is conducted. The minimum amount of water which must be present in the solution to achieve dissolution of the carrier material is dependent in part on the solubility and dissolution characteristic of the carrier material. Thus, for example, the greater the D.E. of the starch hydrolysate carrier material (described herein) is, as the D.E. approaches the upper D.E. limit of 28, the less water would be required in the aqueous solution. Typically, water will be present in the solution in an amount of from about 30 to about 99%, preferably from about 40 to about 95%, and most preferably from about 45 to about 75%, by weight, based on the weight of the solution. Thus, the amount of fixable material and any other additives which are employed to prepare the aqueous solution are limited by this requirement.

When the fixable agent is hydrophobic (i.e. water emulsifiable), it is incorporated into the discontinuous phase of an aqueous emulsion wherein water forms the continuous phase.

Emulsifying agents such as lecithin, gum arabic, polysorbates, monodiglycerides, sulfonates, ionic and non-ionic detergents and the like may be employed when necessary to achieve emulsification. Extenders and solubilizers, such as sesame oil, cottonseed oil, as well as weighting agents for the discontinuous phase such as, a glycerol ester of rosin, brominated oil, and the like may be employed to also aid in emulsification of the fixable agent.

The amount of water present in the emulsion is controlled by the same requirements and considerations described in connection with the solution of the fixable agent. Thus, the amount of water present in the emulsion will typically vary from about 35 to about 99%, preferably from about 55 to about 85%, and most preferably from about 65 to about 80%, by weight, based on the weight of the emulsion.

Antioxidants such as tocopherols, butylated hydroxyanisole and the like may be incorporated into the solution or emulsion containing the fixable agent.

The viscosity of the aqueous solution or emulsion containing the fixable agent is controlled by any method known in the art, such as by the addition of water or by controlling the type and amount of emulsifier, to be not greater than about 200 centipoise (cps), typically from about 0.22 to about 200 cps, preferably from about 10 to about 130 cps, and most preferably from about 15 to about 125 cps. A low viscosity facilitates the handling of the emulsion or solution and converses energy which would otherwise be expended in spraying a viscous solution or emulsion from a spray nozzle.

The preparation of the fixable agent containing emulsion can be effected by methods which will be apparent to those skilled in the art. Thus, a mixture of water fixable agent, emulsifying agent when needed, as well as any other adjuvants are agitated until all the dispersoids are uniformly distributed and if necessary by passing the mixture through a homogenizer.

Once the solution or emulsion containing the fixable agent is prepared, droplets thereof are introduced or impinged onto the surface of a suitable carrier material.

The carrier material can include a wide variety of materials, the identity and physical configuration of which are dictated by their ability to perform in accordance with the mechanism which has been found to be essential in order to achieve fixation as described herein. Thus, the identity of the carrier material is defined in terms of essential properties which it must possess which include dissolution characteristic, solubility, film forming ability, as well as the characteristics of the film so formed.

The dissolution characteristic of the carrier material reflects its ability to prevent undue spreading of a droplet of water or the aqueous phase of a droplet of emulsion (referred to herein collectively as a "water droplet") when impinged thereon.

The dissolution characteristic embodies the balance which exists between the dissolution time of the carrier material into the "water droplet" and the viscosity response of the carrier material at increasingly higher concentrations in the "water droplet" at a given temperature, e.g., the temperature at which the process is conducted.

For example, if a relatively insoluble particulate material such as sand is employed as the carrier material (for illustrative purposes only), it would be observed that a "water droplet" which impinges on a bed of the sand would spread out, wet, and fill the interstitial spaces between a large number of sand particles but would not dissolve them over any given period of time. The extent of the spreading of this water droplet in this instance is not affected by a viscosity response of the water droplet since the sand is insoluble therein and the viscosity of the "water droplet" will remain the same over a given period of time. However, when the bed material is soluble or partly soluble in the "water droplet" the viscosity thereof will increase with time when it contacts an excess of the carrier bed material due to dissolution thereof into the droplet. The relationship of the degree of viscosity increase to the increase in the concentration of the carrier material in the "water droplet", referred to herein as the viscosity response, will vary depending on the choice of the carrier material.

Thus, a carrier material which experiences a rapid increase in viscosity as its concentration in water increases will slow the spread of the "water droplet" in the carrier bed.

Separate and distinct from the viscosity response property of the carrier material is its dissolution time, i.e., the time it takes to achieve a saturated solution when a "water droplet" is contacted with an excess of carrier material. The dissolution time of the carrier material is significant since it is a characteristic of the carrier material as described herein that it forms a film from a saturated solution thereof in water. If the dissolution time of the carrier material into the "water droplet" is very short a saturated solution will be rapidly achieved and the "water droplet" will quickly form a skin or film on the surface thereof thereby preventing or stopping further spread of the droplet. Thus, the two properties of dissolution time and viscosity response of the carrier material operate simultaneously to determine the extent of spreading of the "water droplet" in the carrier material.

A carrier material with the proper dissolution characteristic will therefore reduce the number of carrier material particles which are wet by each "water droplet" by virtue of its viscosity response and provide sufficient time for the carrier particles which are wet to dissolve therein and form a saturated solution which skins as described herein. Thus, as the dissolution time decreases the degree of viscosity response (i.e., increase) which the carrier material must exhibit also decreases. Likewise, as the dissolution time increases, the carrier material must exhibit an increasingly greater viscosity response at increasingly lower concentrations in order to prevent undue spreading of the water droplet. It is therefore possible for a suitable carrier material to exhibit initial rapid increase in viscosity at a relatively low concentration and then take a relatively long time to go from this low concentration to saturation.

If either the dissolution time or viscosity response are not in the proper balance the "water droplet" will continue to spread to such an extent that only the surface of a relatively large number of carrier particles are wet before dissolution of a relatively small number of carrier particles occurs. This causes the surface of the wet particles to become tacky and stick together. Such an occurrence is observed by the continuous formation of fragile agglomerates which readily rupture to the touch. Thus, the process of the present invention relies on dissolution of carrier material to achieve the results described herein and not merely surface wetting of the carrier particles.

Accordingly, the carrier material is characterized by a dissolution characteristic wherein balance between dissolution time and viscosity response at the temperature at which the process is conducted is sufficient to prevent undue spreading of the "water droplet" into the carrier material such that fragile agglomerates of the carrier material and the water droplets are substantially avoided.

Thus, the possession by a carrier material of the proper dissolution characteristic is easily determined by running the process described herein and observing the nature of the particles formed.

The dissolution time of the carrier material can be controlled to some extent by controlling the particle size thereof.

Preferably the particle size of the carrier material will be substantially entirely within the range sufficient to pass through about a 40 to about 400 mesh screen.

The carrier material must also possess a solubility in water at the temperature at which the process is conducted of at least 10 g/100 g of water, preferably at least 25 g/100 g of water, and most preferably at least 50 g/100 g of water. A high solubility is preferred since the carrier must dissolve into the "water droplets" containing the fixable agent.

The carrier material must also possess the ability to form films from a saturated solution thereof in water at the temperature at which the process is conducted. Such films can be observed as "skin" which forms about the saturated carrier solution droplet as the saturated solution exceeds the solubility limit of the carrier upon evaporation of the water present therein.

Finally, the films which form upon evaporation of a saturated carrier solution must preferentially pass water through the surface thereof in favor of the fixable agent. Thus, the carrier film which forms on the droplets retains the fixable agent in the interior of the droplet while the water evaporates and the amount of loss of the fixable agent is kept to a minimum.

The carrier material particles must be in a free flowing condition to be employed in the process of the invention. Since moisture in the carrier particles tends to reduce the fluidity thereof, it is preferred to keep the level of moisture present therein to a minimum. The amount of water permitted in the carrier material should be insufficient to cause the carrier particles to cake. For example, a starch hydrolysate having a D.E. of about 9 to 12 will accept about 13%, by weight, water while one with a D.E. of about 18 to 22, will accept only about 6%, by weight, water without caking. The carrier particles can therefore be dried to reduce the moisture content as needed to from about 6 to about 12%, preferably from about 1 to about 5%, by weight, based on the weight of the carrier particles.

Accordingly, the carrier material is also preferably relatively non-hygroscopic, e.g., absorbs water in an amount less than about 10%, preferably less than about 8%, and most preferably less than about 5%, by weight, based on the weight of the anhydrous carrier material at a relative humidity of about 50% and ambient temperature. As the carrier material becomes increasingly more hygroscopic (e.g., higher D.E.) the free flowing fixed powders tend to absorb water from the atmosphere and agglomerate.

Materials which fulfill the above requirements include starch hydrolysates having a dextrose equivalent (D.E.) of not greater than about 28, typically from about 1 to about 28, preferably from about 5 to about 24, and most preferably from about 10 to about 20, polyvinylpyrrolidone (PVP), arabinoglactan, gum arabic, and mixtures thereof.

The dextrose equivalent (D.E.) is the measure of the reducing-sugar content calculated as anhydrous dextrose and expressed as a percentage of the total dry hydrolysate as described and adopted by the Corn Industries Research Foundation, Inc.

The starch hydrolysates are typically classified on the basis of the D.E. Thus, "corn syrup solids" is a term commonly applied to starch hydrolysates having a D.E. of not less than about 28. Malto dextrin is the term commonly applied to starch hydrolysates having a D.E. of about 1 to about 27, and "hydrolyzed cereal solids" is another term commonly applied to starch hydrolysates having a D.E. of less than about 13.

Thus, the starch hydrolysates which are employed as the carrier materials include hydrolyzed cereal solids, malto dextrins, and certain corn syrup solids. When the starch hydrolysate having a D.E. of greater than about 28 is employed as the carrier material, caking of the carrier particles results at high relative humidities.

The source of the starch from which the starch hydrolysates can be obtained includes, inter alia, such starch bearing cereals as wheat, rye, barley, oats, rice and preferably corn.

Starch hydrolysates of the type described herein are commercially available. Examples of such products include MOR-REX manufactured by CPC International, Inc. (formerly Corn Products Company), Englewood Cliffs, N.J.; a series of dextrins available under the tradename MALTRIN and further identified as MALTRIN-10 (9-12 D.E.), MALTRIN-15 (13-17 D.E.), and MALTRIN-20 (18-22 D.E.), manufactured by Grain Processing Corp., Muscatine, Iowa; and a series of products available under the trademark AMAIZO FRODEX manufactured by American Maize Prod. Co., Indiana.

The above described carrier materials exhibit suitable dissolution characteristics, solubility in water, excellent film forming properties and pass water through films obtained therefrom in preference to fixable agents.

Certain additives such as propylene glycol, glycerine, sorbitol, carboxymethyl cellulose, and the like may be added to the fixable agent containing medium, when desired, to improve the flexibility of the carrier material present in the final powder product.

The formation of the fixable agent containing medium into droplets can be attained by any number of ways, as would be apparent to one skilled in the art.

All that is required is that the droplets are impinged on the surface of an excess of carrier particles in a manner sufficient to substantially avoid the coalescing and rupture of the droplets. The carrier particles which are contacted with the droplets are present at a sufficiently high density so that each droplet will contact an amount of carrier material which exceeds the solubility of the carrier material in each droplet. This assures that a saturated solution of the carrier material in the droplet can form.

If the droplets are allowed to coalesce the final products will have a non-uniform particle size with large aggregates mixed with small particles.

For example, the droplets of the fixable agent containing medium can be let fall by a moving nozzle upon a stationary bed of carrier powder particles at such a space interval that the droplets do not run together. Or, the carrier bed can be presented as a moving layer (e.g., as on a conveyer belt) below a fixed nozzle adjusted to let the droplets fall at a rate such that the droplets do not run together. Alternately, a spray of droplets is introduced into a fluidized bed of the carrier particles. In the presently preferred method the fixable agent containing medium is passed through a stationary spray head, having several rows of tiny orifices, onto a bed of the powdered carrier material, contained in, and agitated by, a revolving cylindrical drum.

By controlling the size of the droplets the size of the resulting fixed material can be controlled to range from a fine powder to beadlets (e.g., about 0.2 to about 6 mm in diameter).

The temperature at which the fixation process is conducted (i.e., the temperature of the solution or emulsion as it impinges on the carrier particles) is typically from about 5° to about 75° C., preferably from about 15° to about 25° C. and most preferably from about 20° to about 25° C. The lower temperatures of from about 5° to about 25° C. can be employed when the fixable agent is a highly volatile substance. While elevated temperatures may also be employed it is an advantage of the present invention that elevated temperatures are not required.

When the droplets strike the surface of the powdered carrier, the soluble carrier is rapidly taken into solution by the external water phase of the emulsion or the aqueous portion of the solution. This process proceeds until the aqueous phase becomes a completely saturated solution of the carrier. Characteristic of a saturated solution of the carrier, as heretofore described, is their film-forming ability. Any air exposed surface of the droplet, preferably almost immediately, forms a film or "skins over" presenting an effective seal against loss of volatiles other than water.

Shortly after the "skins" or films have formed on the surface of the droplets the filmed droplets will enter a "set" state wherein they will retain their particulate form even upon contact with other similar filmed droplets. The filmed droplets in the set state will still have a substantial (i.e., majority of the water initially present in the droplet) amount of water present in the interior of the droplet. After the particulate form of the filmed droplets has been permanently established but before they are completely dry they are separated from the bed of carrier particles. The separation of the carrier particles and the set filmed droplets is performed to assure that the majority of the remainder of the water contained in the droplets is lost to the atmosphere and not to the carrier bed particles. This prevents agglomeration of the unused carrier particles and avoids the necessity of introducing an additional drying step to remove the water lost to the carrier bed.

The residence time during which the filmed droplets are left in contact with the carrier particles to allow the setting phenomenon to occur and to avoid a substantial loss of the water in the filmed droplet to the carrier particle bed is typically from about 1 to about 15 minutes, preferably from about 1 to about 10 minutes, and most preferably from about 1 to about 5 minutes.

The separation of the unused carrier particles from the set filmed droplets can be achieved by any method known in the art such as by pouring the mixture of carrier particles and set filmed droplets into a vibrating sieve which allows the carrier particles to drop through but retains the filmed droplets. The unused carrier particles are collected and recirculated to the carrier bed. The set filmed droplets are then dried at room temperature by spreading them out in drying trays and preferably by exposing them to a cool stream of dehumidified air.

The resulting dry fixed particles or beadlets possess a generally oval to spheroidal shape of fairly uniform size. The amount of fixable agent which can be fixed in the beadlets can vary from about 4 to about 10%, preferably from about 6 to about 10%, and most preferably from about 8 to about 10%, by weight, based on the weight of the beadlet.

The process of the present invention will have obvious uses in a variety of fields. In the flavoring field, such items as flavoring oils, buffers and acids can be simultaneously fixed in a single, dry, free-flowing matrix form and added to various food products. For topical applications in the cosmetic field, lanolin esters, perfume oils and colors can be processed into a dry free-flowing state. The dry powder will release its emollients on contact with bath or wash water to provide a beneficial effect.

In the insecticidal field various insecticides can be fixed in a dry state and distributed as is or in fertilizers and released by contact with rain water. In the pharmaceutical field various medicinals can be fixed in the dry state and administered topically or orally as desired.

The invention is additionally illustrated in connection with the following Examples which are to be considered as illustrative of the present invention. It should be understood, however, that the invention is not limited to the specific details of the Examples.

EXAMPLE 1

A solution having a viscosity of less than about 50 cps is prepared from the following components and maintained as a temperature of about 5° C.:

| | Parts, by Weight |
|---|---|
| Cold Deionized Water | 300.00 |
| Freshly Distilled Acetaldehyde | 100.00 |
| Butylated Hydroxy Anisole (BHA) | 0.02 |

A five (5) gallon open head drum is end-mounted on a variable speed drive shaft. The assembly is tilted so that the open end of the drum is 3 to 4 inches higher than the rear portion mounted on a vari speed drive shaft.

A cover with a four inch diameter hole in the center is fastened over the elevated end of the drum. The drum is then charged through the open end with 4,200 parts, by weight, of a 10–13 D.E. starch hydrolysate available under the trade name MOR-REX 1918.

The drum is then rotated at a speed of about 37 R.P.M.'s. The cold acetaldehyde solution is sprayed onto the moving surface of the MOR-REX 1918 within the drum using 27 gauge hypodermic needles.

The drum is permitted to rotate for an additional 15 minutes after the final material is sprayed into the drum chamber. The contents of the drum are then sifted yielding 1141 parts, by weight, of beadlets on a 30 mesh sieve.

Analysis of the air dried beadlets shows an acetaldehyde content of 4.6%, by weight, based on the weight of the beadlet. To better illustrate the quality of the encapsulation, a sample is placed in an oven at 40° C. (acetaldehyde boils at 21° C.) for one week. The beadlets show an acetaldehyde content of 4.1% indicating a minimal loss of acetaldehyde.

EXAMPLE 2

This example illustrates the fixation of a solution of True Fruit Grape flavoring concentrates, with other natural flavors (W.O.N.F.) which are typically used in flavoring compositions to intensify the flavor of the grape concentrate and which have a wide range of volatilities in an ethanol water system. The viscosity of the solution is less than 50 cps. The procedure is conducted in accordance with Example 1 except that the process is conducted at an ambient room temperature of 20° C. No water addition is necessary since this True Fruit Grape W.O.N.F. by nature contains 43%, by weight, of water, and also 15% by volume, of ethanol.

Analysis, which is done organoleptically shows an equivalent flavor principle content of 33 to 40% True Fruit Grape W.O.N.F. in the air dried beadlets.

The organoleptic test is conducted by taste comparisons using a panel of judges trained to evaluate taste and aroma. The test panel uses threshold levels and intensity ratings to compare the initial mixture prior to fixation to the flavor strength of the resulting product. Flavor equivalency ratings are determined by "odd cup tests" wherein testing continues until an odd cup flavor difference and intensity is not perceived.

No loss of freshness is experienced in the flavor character as opposed to the loss which typically occurs during spray-drying wherein heat is utilized.

EXAMPLE 3

This Example illustrates the fixation of essential oils which maintain their fresh flavor characteristics after completion of the process.

An emulsion having a viscosity of less than about 50 cps is prepared containing the following components:

|  | Parts by Weight |
|---|---|
| Gum Acacia Purified | 2.56 |
| Oil Lemon C.P. U.S.P. | 30.72 |
| Water | 66.57 |
| Butylated Hydroxy Anisole | 0.15 |

The overall procedure is conducted in accordance with Example 1 with the exception that the process is performed at an ambient room temperature of 21° C. Analysis of the dried beadlets shows an encapsulated lemon oil content of 8.2%, by weight, based on the weight of the beadlets.

No loss of fresh flavor character, as in conventional spray-drying techniques, is detected in an organoleptic test.

EXAMPLE 4

This Example illustrates the fixation of volatile, noxious essential oils. The procedure is conducted under cold conditions (i.e., room temperature) such that aerial contamination, which would ordinarily occur in spray-drying techniques, is kept to a minimum.

An emulsion having a viscosity of less than about 50 cps is prepared containing the following components:

|  | Parts by Weight |
|---|---|
| Deionized Water | 77.50 |
| Gum Acacia Purified | 2.50 |
| Sesame Oil | 1.00 |
| Natural Mustard Oil | 19.00 |

The fixation procedure is conducted generally in accordance with Example 1 except that all work is performed at an ambient room temperature of 21° C.

Analysis of the dried beadlets shows a natural oil of mustard content of 7%, by weight, based on the beadlet weight.

EXAMPLE 5

This Example illustrates the fixation of a relatively noxious essential oil. As stated in the previous example, cold conditions, e.g., room temperatures or below, afford encapsulation with minimal aerial environmental contamination.

An emulsion having a viscosity of less than about 50 cps is prepared from the following components:

|  | Parts by Weight |
|---|---|
| Water | 77.5 |
| Gum Acacia Purified | 2.5 |
| Garlic Oil | 20.0 |

The fixation process is conducted generally in accordance with Example 1 but at a temperature of 20° C. The use of ambient temperatures serves to lower the vapor pressure of noxious oils.

Analysis of the dried beadlets by steam distillation shows a minimum garlic oil content of 6.4%, by weight, based on the beadlet weight.

EXAMPLE 6

This Example illustrates the fixation of essential oils.

An emulsion having a viscosity of less than about 50 cps is prepared from the following components:

|  | Parts, by weight |
|---|---|
| Gum Acacia | 2.60 |
| Orange Oil | 30.00 |
| Water | 67.25 |
| Butylated Hydroxy Anisole (BHA) | 0.15 |

The procedure is conducted in accordance with Example 3. Analysis of the air dried beadlets shows a orange oil content of 9.1% by weight, based on the weight of the beadlets.

An organoleptic testing panel indicated a preference for cold fixed orange oil over spray-dried orange oil.

The residual moisture in Examples 1 through 5 of the air dried beadlets is approximately 5% i.e., that of the carrier material MOR-REX 1918 under ambient conditions.

EXAMPLE 7

This example illustrates the fixation of orange oil in a higher D.E. starch hydrolysate.

An emulsion having a viscosity of less than about 50 cps is prepared from the following components:

|  | Parts by weight |
|---|---|
| Gum Acacia | 2.60 |
| Orange Oil | 30.00 |
| Water | 67.25 |
| B.H.A. | 0.15 |

The procedure is conducted in accordance with Example 3 with the exception that the carrier material is changed from MOR-REX 1918 (a 10 to 12 D.E. starch hydrolysate) to FRODEX 24-924 (a 24 D.E. starch hydrolysate).

Analysis of the final product shows an oil content of 9.1%, by weight, based on the weight of the beadlets.

Exposure of the fixed beadlets to ambient temperatures and humidity (70°–75° F. 30 to 45% R.H.) shows no pronounced tendency to cake or agglomerate.

EXAMPLE 8

The Example illustrates the ability of the subject process to fix volatile fruit essences.

Following the procedure of Example 3, 15 g of a solution of 150 Fold Grape essence which comprises about 94% by weight, water, about 5%, by weight, ethanol, and about 1% by weight, natural flavorants of grape essence obtained from the concentration of grape juice is sprayed onto a particle bed of MOR-REX 1918.

The 15 grams of 150 Fold Grape Essence yields 60.61 g of dry fixed particles containing the flavor principle equivalent of 28%, based on the initial flavor principle equivalent of the 150 Fold Grape Essence prior to fixation, as determined by an organoleptic testing panel.

No loss of fresh flavor character, as in conventional spray drying techniques, was detected in an organoleptic test.

EXAMPLE 9

This Example illustrates the use of gum arabic as the carrier material a commonly used material for standard emulsification and spray-drying.

The procedure is conducted in accordance with Example 3 except that a bed of spray-dried gum arabic is used as the carrier material. The spray dried bed is more quickly soluble than the standard ground gum.

Analysis of the air dried beadlets shows a lemon oil content of 10%, by weight, based on the weight of the beadlet.

COMPARATIVE EXAMPLE 1

Example 7 is repeated with the exception that sucrose is substituted as a carrier material. Baker's Special grind sugar is used for its small particle size and free flow characteristics.

Only a small portion of the emulsion can be sprayed onto the bed material before the sugar begins to cake. The sieved mixture yields large particle sizes and the oil retention drops to less than 0.1%. Normal retentions are on the order of 8%.

The crystalline friable nature of sugar does not lend itself to sound beadlet formation and its high degree of sweetness can affect some flavor profiles adversely. The sugar's poor resistance to caking in the presence of moisture, the formation of large, lumpy particles and very poor oil retention render it unsuitable for use in the present invention.

COMPARATIVE EXAMPLE 2

Example 7 is repeated with the exception that lactose is substituted as the carrier material. Much lower quantities of emulsion are accepted by this bed material than 28 D.E. or lower starch hydrolyzates before caking.

The sieved and dried particles are large agglomerates and extremely friable under lightest finger pressure which is indicative of an unacceptable dissolution characteristic of the lactose.

A low oil retention of about 1% by weight based on the weight of the beadlet indicates a poor fixation rate. It is concluded that lactose (milk sugar) is an unacceptable carrier material for use in the process of the present invention.

COMPARATIVE EXAMPLE 3

Example 7 is repeated with the exception that FRODEX 36, (a 36 D.E. starch hydrolysate) is employed as a carrier material.

After a residence time of 15 minutes, the carrier bed of semi-hard particles are separated from the bed material by sieving.

The time required to air dry is much longer than for particles prepared from lower D.E. hydrolyzates employed in the Examples. After drying over a period of 36 hours the product is placed in a sealed glass jar. The product cakes very badly into virtually a solid mass indicating a great hygroscopic tendency to retain water.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made without departing from the spirit of the invention.

What is claimed is:

1. A process for fixing a volatile flavoring agent selected from at least one member of the group consisting of acetaldehyde and an essential oil in a carrier matrix material of starch hydrolysates having a dextrose equivalent not greater than about 28 to impart a dry free flowing particulate configuration to said carrier fixed flavoring agent comprising:
    (a) providing an aqueous liquid containing said flavoring agent wherein when said flavoring agent comprises acetaldehyde said acetaldehyde is dissolved in water and when said flavoring agent comprises an essential oil said essential oil is emulsified as a discontinuous phase in said water, with said water in said aqueous liquid being present in an amount sufficient to dissolve the carrier material when converted to a droplet configuration and contacted with said carrier material while in particulate form at a temperature at which the process is conducted and wherein the viscosity of said aqueous liquid is not greater than about 200 cps at the temperature at which the process is conducted,
    (b) impinging droplets of said aqueous liquid containing said flavoring agent onto the surface of a bed of free flowing carrier particles whereby a portion of the carrier particles is dissolved into the aqueous portion of said aqueous liquid to form a saturated solution of the carrier material in said droplets and in a manner sufficient to substantially avoid the coalescence of the droplets,
    (c) allowing a portion of the water contained in the saturated droplets to evaporate thereby forming a continuous film of the carrier material on the surface of said droplets,
    (d) separating the resulting filmed droplets from the carrier particles after said filmed droplets have set to a particulate form which is maintained when contacted with similar filmed droplets and before the remainder of the water present therein passes through the droplet film surface to the extent that the carrier particles remaining in the carrier bed are wet thereby and caused to agglomerate, and
    (e) drying the separated filmed droplets to allow the remainder of the water present therein to preferentially pass through the film surface.

2. A process for fixing a volatile flavoring agent according to claim 1 wherein said flavoring agent is acetaldehyde.

3. A process for fixing a volatile flavoring agent according to claim 1 wherein said flavoring agent is an essential oil.

4. A process for fixing a volatile flavoring agent according to claim 3 wherein said essential oil is mustard oil.

5. A process for fixing a volatile flavoring agent according to claim 1 wherein said carrier matrix material has a dextrose equivalent of approximately 9 to 12.

6. A process for fixing a volatile flavoring agent according to claim 1 wherein the viscosity of said aqueous liquid provided in step (a) is approximately 15 to 125 cps at the temperature at which the process is conducted.

7. A process for fixing a volatile flavoring agent according to claim 1 wherein said process is conducted at a temperature of approximately 15° to 25° C.

8. A process for fixing a volatile flavoring agent according to claim 1 wherein said filmed droplets formed in step (c) are allowed to remain in contact with said bed of free flowing carrier particles for a residence time of approximately 1 to 15 minutes prior to separation in step (d).

9. A process for fixing a volatile flavoring agent according to claim 1 wherein droplets of said aqueous liquid recited in step (b) are produced by a stationary spray head and impinge upon said free flowing carrier particles while provided in a revolving cylindrical drum.

* * * * *